(12) United States Patent
Logan et al.

(10) Patent No.: US 9,708,059 B2
(45) Date of Patent: Jul. 18, 2017

(54) COMPOUND WING VERTICAL TAKEOFF AND LANDING SMALL UNMANNED AIRCRAFT SYSTEM

(71) Applicant: The United States of America as represented by the Administrator of the National Aeronautics and Space Administration, Washington, DC (US)

(72) Inventors: Michael J. Logan, Chesapeake, VA (US); Mark A. Motter, Williamsburg, VA (US); Richard Deloach, Hampton, VA (US); Thomas L. Vranas, Hampton, VA (US); Joseph M. Prendergast, Boulder, CO (US); Brittney N. Lipp, Playa Del Rey, CA (US)

(73) Assignee: THE UNITED STATES OF AMERICA AS REPRESENTED BY THE ADMINSTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 143 days.

(21) Appl. No.: 14/625,806

(22) Filed: Feb. 19, 2015

(65) Prior Publication Data
US 2016/0272315 A1 Sep. 22, 2016

Related U.S. Application Data

(60) Provisional application No. 61/941,692, filed on Feb. 19, 2014.

(51) Int. Cl.
*B64C 39/00* (2006.01)
*B64C 39/02* (2006.01)
*B64C 15/00* (2006.01)

(52) U.S. Cl.
CPC ............ *B64C 39/005* (2013.01); *B64C 15/00* (2013.01); *B64C 39/024* (2013.01);
(Continued)

(58) Field of Classification Search
CPC ....... B64C 39/005; B64C 29/00; B64C 39/08; B64C 39/024; B64C 2201/021;
(Continued)

(56) References Cited

U.S. PATENT DOCUMENTS 2,082,674 A * 6/1937 Young .................... B64C 27/16
244/66
2,347,230 A 4/1944 Zuck
(Continued)

OTHER PUBLICATIONS

Michael J. Logan et al., "Experimental Optimization of a Free-to-Rotate Wing for Small UAS," AIAA Aviation, 32nd AIAA Applied Aerodynamics Conference, Jun. 16-20, 2014, pp. 1-6, Atlanta, GA.

Primary Examiner — Philip J Bonzell
Assistant Examiner — Steven Hawk
(74) Attorney, Agent, or Firm — Andrea Z. Warmbier

(57) ABSTRACT

Systems, methods, and devices are provided that enable robust operations of a small unmanned aircraft system (sUAS) using a compound wing. The various embodiments may provide a sUAS with vertical takeoff and landing capability, long endurance, and the capability to operate in adverse environmental conditions. In the various embodiments a sUAS may include a fuselage and a compound wing comprising a fixed portion coupled to the fuselage, a wing lifting portion outboard of the fixed portion comprising a rigid cross member and a controllable articulating portion configured to rotate controllable through a range of motion from a horizontal position to a vertical position, and a freely rotating wing portion outboard of the wing lifting portion and configured to rotate freely based on wind forces incident on the freely rotating wing portion.

9 Claims, 8 Drawing Sheets

(52) U.S. Cl.
CPC .. *B64C 2201/021* (2013.01); *B64C 2201/088* (2013.01); *B64C 2201/165* (2013.01)

(58) Field of Classification Search
CPC .......... B64C 2201/108; B64C 29/0083; B64C 29/0075; B64C 2201/088
USPC .............................. 244/7 R, 7 C, 8, 12.4, 39
See application file for complete search history.

(56) References Cited

U.S. PATENT DOCUMENTS

| | | | | |
|---|---|---|---|---|
| 3,035,789 A * | 5/1962 | Young | B64C 29/0033 | 244/48 |
| 3,107,882 A * | 10/1963 | Matteson | B64C 29/0033 | 244/48 |
| 3,139,248 A * | 6/1964 | Alvarez-Calderon | B64C 3/42 | 244/207 |
| 3,181,810 A * | 5/1965 | Olson | B64C 29/0033 | 244/66 |
| 3,291,242 A * | 12/1966 | Tinajero | B60V 1/04 | 180/116 |
| 3,335,977 A * | 8/1967 | Meditz | B64C 3/42 | 244/12.4 |
| 3,430,894 A * | 3/1969 | Levinsky | B64C 3/385 | 244/211 |
| 3,666,209 A * | 5/1972 | Taylor | B64C 29/0033 | 244/12.4 |
| 3,730,459 A * | 5/1973 | Zuck | B64C 3/38 | 244/48 |
| 5,096,140 A * | 3/1992 | Dornier, Jr. | B64C 29/0033 | 244/12.4 |
| 5,098,034 A * | 3/1992 | Lendriet | B64C 3/385 | 244/12.5 |
| 5,115,996 A * | 5/1992 | Moller | B64C 29/0025 | 239/265.19 |
| 5,340,057 A * | 8/1994 | Schmittle | B64C 3/385 | 244/39 |
| 5,395,073 A * | 3/1995 | Rutan | B64C 3/385 | 244/38 |
| 5,509,623 A * | 4/1996 | Schmittle | B64C 3/385 | 244/113 |
| 5,758,844 A * | 6/1998 | Cummings | B64C 29/0033 | 244/12.4 |
| 5,765,777 A * | 6/1998 | Schmittle | B64C 3/385 | 244/17.25 |
| 5,769,359 A * | 6/1998 | Rutan | B64C 3/385 | 244/120 |
| 5,823,468 A * | 10/1998 | Bothe | B64B 1/08 | 244/12.3 |
| 5,863,013 A * | 1/1999 | Schmittle | B64C 3/385 | 244/104 LS |
| 5,941,478 A * | 8/1999 | Schmittle | B64C 1/00 | 244/120 |
| 6,367,736 B1 * | 4/2002 | Pancotti | B64D 35/08 | 244/48 |
| 6,607,161 B1 * | 8/2003 | Krysinski | B64C 9/00 | 244/56 |
| 7,802,754 B2 * | 9/2010 | Karem | B64C 29/0033 | 244/12.4 |
| 7,871,033 B2 * | 1/2011 | Karem | B64C 27/08 | 244/17.23 |
| 7,922,115 B2 * | 4/2011 | Colgren | B64C 9/02 | 244/120 |
| 7,997,526 B2 * | 8/2011 | Greenley | A63H 27/02 | 244/12.4 |
| 8,083,172 B2 * | 12/2011 | Karem | B64C 3/185 | 244/7 C |
| 8,505,846 B1 * | 8/2013 | Sanders, II | B64C 11/003 | 244/7 A |
| 8,646,720 B2 * | 2/2014 | Shaw | B64C 27/20 | 244/17.23 |
| 8,991,751 B2 * | 3/2015 | Page | B64C 29/02 | 244/39 |
| 9,102,401 B2 * | 8/2015 | Collins | B64C 29/0033 | |
| 9,120,560 B1 * | 9/2015 | Armer | B64C 29/0008 | |
| 2002/0003189 A1 * | 1/2002 | Kuenkler | B63H 5/125 | 244/26 |
| 2002/0100834 A1 | 8/2002 | Baldwin | | |
| 2004/0245374 A1 * | 12/2004 | Morgan | B64C 29/0025 | 244/12.3 |
| 2005/0109874 A1 | 5/2005 | Baldwin | | |
| 2005/0151001 A1 | 7/2005 | Loper | | |
| 2005/0230520 A1 * | 10/2005 | Kusic | B64C 27/08 | 244/12.4 |
| 2006/0157616 A1 * | 7/2006 | Kusic | B64C 27/08 | 244/17.23 |
| 2006/0214052 A1 | 9/2006 | Schlunke | | |
| 2007/0215748 A1 | 9/2007 | Robbins et al. | | |
| 2008/0223979 A1 | 9/2008 | Schlunke | | |
| 2009/0008499 A1 * | 1/2009 | Shaw | B64C 27/20 | 244/17.23 |
| 2009/0140095 A1 | 6/2009 | Sirohi et al. | | |
| 2009/0266942 A1 * | 10/2009 | Karem | B64C 29/0033 | 244/7 C |
| 2010/0140415 A1 | 6/2010 | Goossen | | |
| 2010/0193625 A1 | 8/2010 | Sommer | | |
| 2010/0230547 A1 | 9/2010 | Tayman | | |
| 2011/0036955 A1 * | 2/2011 | Karem | B64C 3/10 | 244/7 C |
| 2011/0144834 A1 | 6/2011 | Sommer | | |
| 2011/0168851 A1 | 7/2011 | Cherepinsky | | |
| 2011/0315809 A1 * | 12/2011 | Oliver | B64C 29/0033 | 244/12.4 |
| 2012/0048990 A1 | 3/2012 | Sommer | | |
| 2012/0097801 A1 | 4/2012 | Barrett | | |
| 2012/0119016 A1 * | 5/2012 | Shaw | B64C 29/0025 | 244/12.3 |
| 2012/0234968 A1 * | 9/2012 | Smith | B64C 29/0033 | 244/12.3 |
| 2013/0062455 A1 * | 3/2013 | Lugg | B64C 29/0025 | 244/12.3 |
| 2014/0316608 A1 | 10/2014 | Alber et al. | | |
| 2014/0339372 A1 * | 11/2014 | Dekel | B64C 29/0033 | 244/7 R |
| 2014/0352462 A1 | 12/2014 | Wood | | |
| 2015/0028151 A1 * | 1/2015 | Bevirt | B64C 29/0025 | 244/6 |
| 2015/0136897 A1 * | 5/2015 | Seibel | B64C 29/0033 | 244/6 |

* cited by examiner

COMPOUND WING VERTICAL TAKEOFF AND LANDING SMALL UNMANNED AIRCRAFT SYSTEM

CROSS-REFERENCE TO RELATED PATENT APPLICATIONS

This patent application claims the benefit of and priority to U.S. Provisional Patent Application No. 61/941,692, filed on Feb. 19, 2014, the entire contents of which are hereby incorporated by reference in their entirety.

STATEMENT REGARDING FEDERALLY SPONSORED RESEARCH OR DEVELOPMENT

The invention described herein was made in part by employees of the United States Government and may be manufactured and used by and for the Government of the United States for governmental purposes without the payment of any royalties thereon or therefore.

BACKGROUND OF THE INVENTION

Small unmanned aircraft systems (sUASs), such as unmanned aircraft systems weighing a few pounds, are growing in popularity and the sUAS industry is estimated to become an eight billion dollar a year industry. One of the main challenges faced in the operation of current sUASs is that current sUASs tend to have great difficulty operating in gusty or adverse wind conditions. Because of the current sUAS's light weight and relatively small size, environmental factors can have a tremendous impact on the current sUAS's ability to operate, navigate, and conduct a mission. Currently, in many areas of the United States, even if the Federal Aviation Administration (FAA) allowed the use of current sUASs for commercial flights, the environmental conditions (e.g., wind) limit operations, in some cases, to only about twenty five percent of the available flight hours. The environmental restrictions imposed on current sUASs limit the use of current sUASs by the United States' 19,000 first responder agencies and present a heavy penalty on the life saving uses of sUASs.

In addition to robust performance in varying environmental conditions, a need exists for sUASs having a combination of extended endurance, vertical takeoff and landing (V/TOL) capability, and low cost. Past attempts at multi-rotor and helicopter sUASs have had too short endurance times to meet the need. Past attempts at fixed wing sUASs have required significant takeoff and landing areas that are not suitable for all applications. Additionally, past attempts at gust resistant wing structures for multi-rotor and helicopter sUASs have encountered large penalties associated with their configurations, e.g., loss of lift, inefficient structure, etc.

BRIEF SUMMARY OF THE INVENTION

The systems, methods, and devices of the present invention enable robust operations of a small unmanned aircraft system (sUAS) using a compound wing. The various embodiments may provide a sUAS with vertical takeoff and landing capability, long endurance, and the capability to operate in adverse environmental conditions. In the various embodiments a sUAS may include a fuselage and a compound wing comprising a fixed portion coupled to the fuselage, a wing lifting portion outboard of the fixed portion comprising a rigid cross member and a controllable articulating portion configured to rotate controllable through a range of motion from a horizontal position to a vertical position, and a freely rotating wing portion outboard of the wing lifting portion and configured to rotate freely based on wind forces incident on the freely rotating wing portion.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
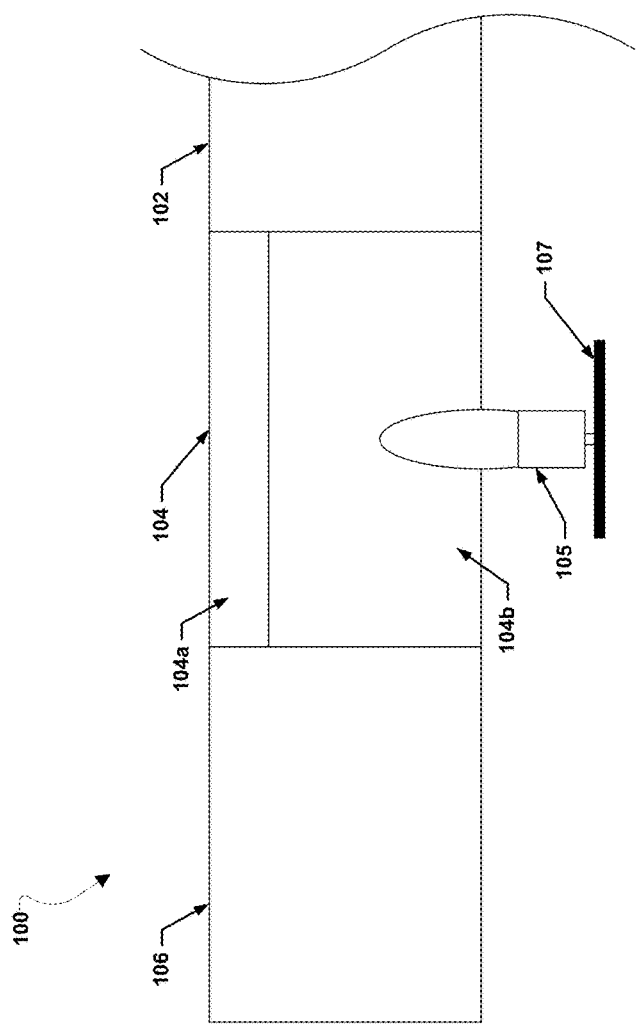
FIG. 1 is a component block diagram illustrating a top view of an embodiment compound wing in a forward flight configuration.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments enable robust operations of a small unmanned aircraft system (sUAS) using a compound wing. The various embodiments may provide a sUAS with vertical takeoff and landing capability, long endurance, and the capability to operate in adverse environmental conditions. In an embodiment, each side of a compound wing of the sUAS (e.g., the left side wing and the right side wing of the sUAS) may include three portions: a first fixed inner portion located adjacent to the fuselage, controlled articulation intermediate portion outboard of the first fixed inner portion, and a free-to-rotate outer portion outboard of the controlled articulation intermediate portion. The controlled articulation intermediate portion may include lift engines mounted on a controllably articulating portion of the wing to provide vertical lift in the vertical takeoff and landing (V/TOL) mode. In an embodiment, the lift engines may shut down during the forward flight mode when the controllable articulating portion is rotated to the horizontal position. In an alternative embodiment, the lift engines may remain on and be used during forward flight. In the various embodiments, the lift engines on the various sides of the wings may be independently controllable.

In an embodiment, the sUAS may include an aft propulsor that may be articulated and configured such that the thrust being generated is always in the proverse (i.e., synergistic or favorable) direction. In an embodiment, the aft propulsor may be rotated down during the V/TOL mode to provide vertical balancing force and rotated up in the forward flight mode to provide thrust with lift provided by the wing aerodynamics. In alternative embodiments, an aft pitch control motor and variable pitch propeller may be substituted for the aft propulsor. In other embodiments, a fixed pitch motor and propeller may be substituted for the aft propulsor.

In the various embodiments, the compound wing's free-to-rotate outer portions (i.e., the freely rotating outboard wing portions) are allowed to freely rotate. The design of the free-to-rotate outer portions may be such that the portions provide a balance between gust absorption and useful lift generation.

In the various embodiments, a control system for the sUAS may be provided that provides both tandem and differential modes of control for the controllably articulating portion (i.e., a wing lifting portion) of the wing during forward flight and/or V/TOL flight. The control system may include a control architecture that encompasses both different operating modes and a considerable number of control effectors.

FIG. 1 is a component block diagram illustrating a top view of an embodiment of a compound wing 100 in a forward flight configuration. While FIG. 1 only illustrates a right side portion of an overall compound wing, one of ordinary skill in the art will understand that a left side portion of the overall compound wing would be the mirror image of that illustrated in FIG. 1. The compound wing 100 may include a fixed wing portion 102 that may be coupled to the fuselage of the sUAS. Outboard of the fixed wing portion 102 may be a wing lifting portion 104. The wing lifting portion 104 may include two portions: a rigid cross member 104a that is configured not to articulate and a single controllably articulating portion 104b that is configured to move from a horizontal position in line with the fixed wing portion 102 to a vertical position perpendicular to the fixed wing portion 102. The controllably articulating portion 104b may include a lifting motor 105 and propeller 107 that may be controlled to provide lifting force in the V/TOL mode when the controllably articulating portion 104b is rotated to the vertical position. In an embodiment, the lining motor 105 may be shut off in the forward flight mode and only operated in the V/TOL mode. In another embodiment, the lifting motor 105 may continue to operate and provide forward thrust in the forward flight mode. While illustrated as having only one lifting motor 105 and propeller 107, additionally lifting motors 105 and propellers 107 may be included in the controllably articulating portion 104b. Outboard of the wing lifting portion 104 may be a freely rotating outboard wing portion 106. The freely rotating outboard wing portion 106 may be coupled to the wing lifting portion 104 such that the freely rotating outboard wing portion 106 is a tree-to-rotate portion of the wing 100 that freely rotates up or down based on the forces, such as wind gusts, incident upon it in both the V/TOL flight mode and forward flight mode.

Figure 2:
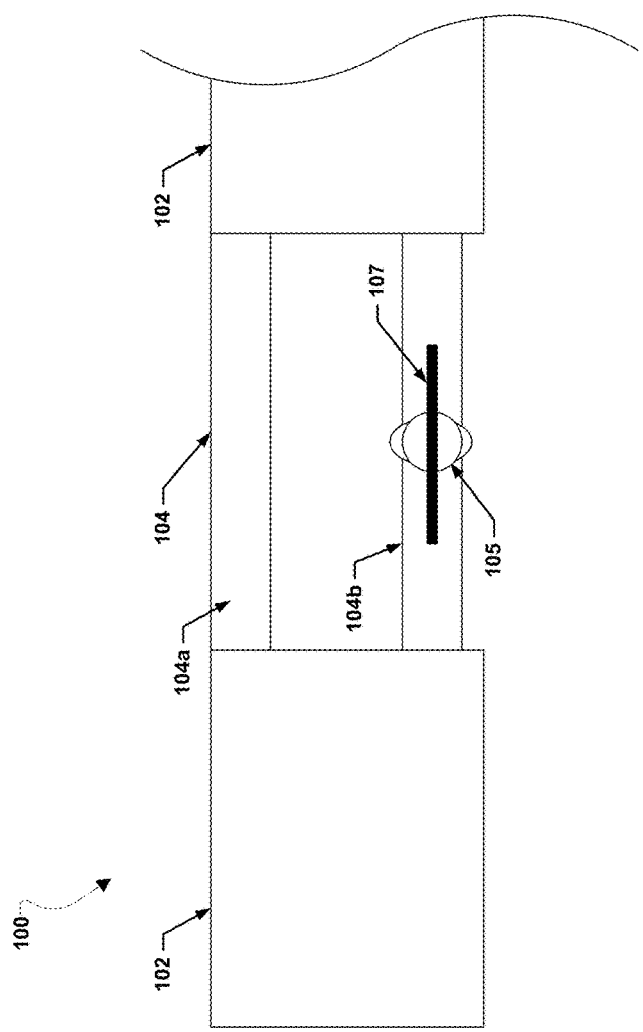
FIG. 2 is a component block diagram illustrating a top view of the embodiment compound wing in a vertical flight configuration.

FIG. 2 is a component block diagram illustrating a top view of the embodiment compound wing 100 in a vertical flight configuration (i.e., V/TOL mode). FIG. 2 illustrates that the controllably articulating portion 104b may be rotated vertically such that the lifting motor 105 is perpendicular to the fixed wing portion 102. In the various embodiments, control surfaces, such as ailerons, may be disposed on the trailing edges of the wing portions 102, 104a, and/or 106.

Figure 3:
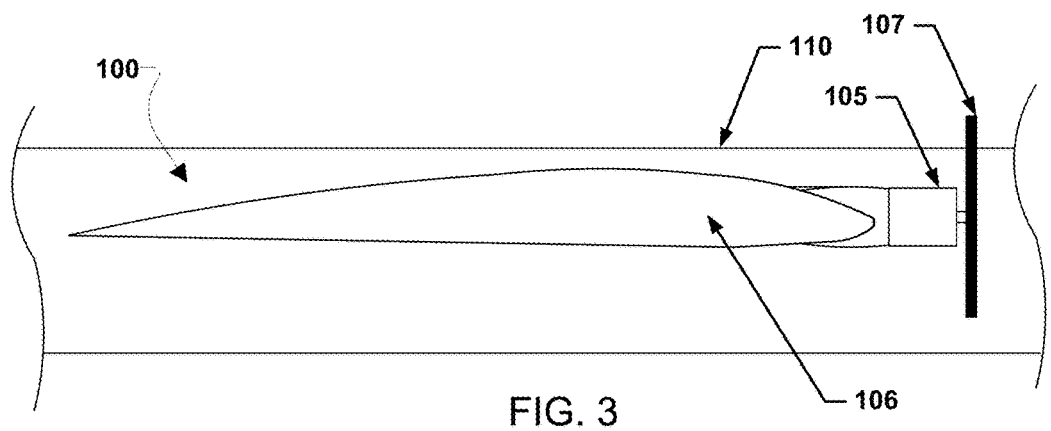
FIG. 3 is a component block diagram illustrating a right side view of the embodiment compound wing in the forward flight configuration with the freely rotating outboard wing portion aligned with the wing lifting portion and fixed wing portion.
Figure 4:
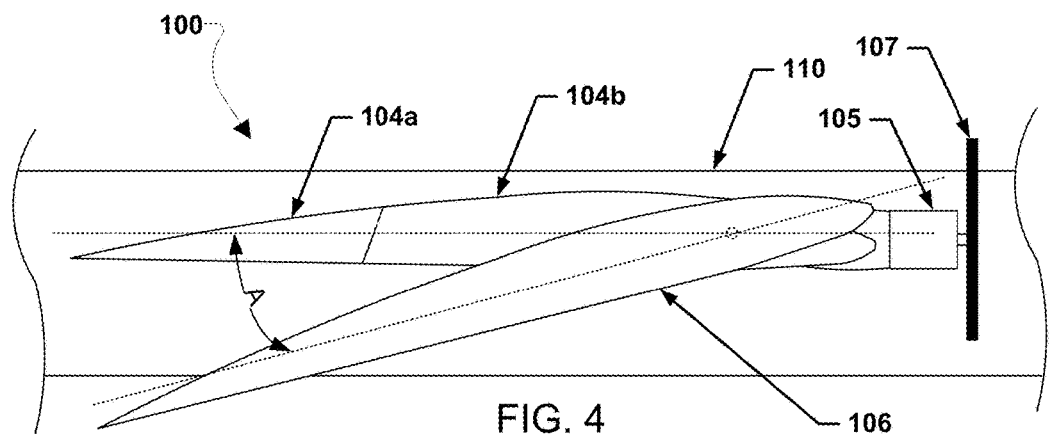
FIG. 4 is a component block diagram illustrating a right side view of the embodiment compound wing in the forward flight configuration with the freely rotating outboard wing portion rotated down with respect to the wing lifting portion and fixed wing portion.
Figure 5:
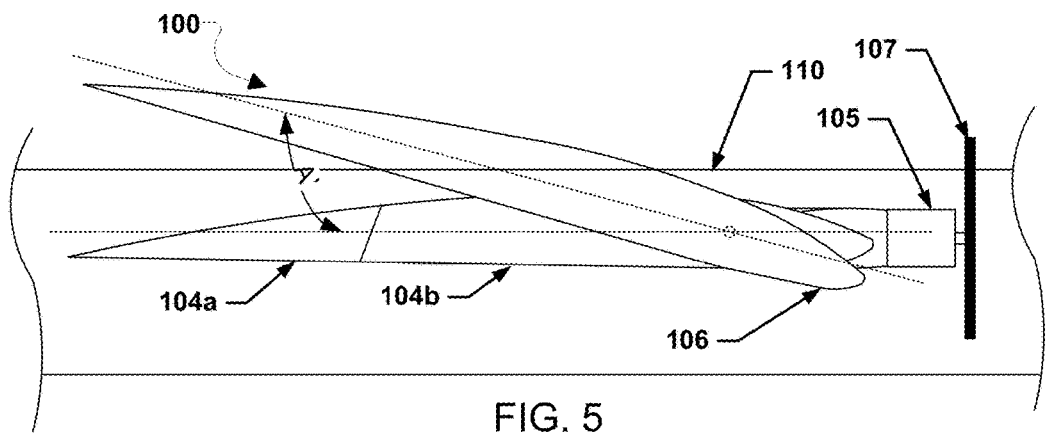
FIG. 5 is a component block diagram illustrating a right side view of the embodiment compound wing in the forward flight configuration with the freely rotating outboard wing portion rotated up with respect to the wing lifting portion and fixed wing portion.

FIG. 3 is a component block diagram illustrating a right side view of the embodiment compound wing 100 in the forward flight configuration with the freely rotating outboard wing portion 106 aligned with the wing lifting portion 104 and the fixed wing portion 102. FIG. 3 illustrates the wing 100 coupled to the fuselage 110 of a sUAS. FIG. 4 is a component block diagram illustrating the right side view of the embodiment compound wing 100 in the forward flight configuration with the freely rotating outboard wing portion 106 rotated down with respect to the wing lifting portion 104 and fixed wing portion 102. The freely rotating outboard wing portion 106 may rotate down a range of degrees "A" relative to the rest of the compound wing 100. FIG. 5 is a component block diagram illustrating the right side view of the embodiment compound wing 100 in the forward flight configuration with the freely rotating outboard wing portion 106 rotated up with respect to the wing lifting portion 104 and fixed wing portion 102. The freely rotating outboard wing portion 106 may rotate down a range of degrees "A'" relative to the rest of the compound wing 100. Through the ability to freely rotate through the range of degrees A and A', the freely rotating outboard wing portion 106 may respond to gust of wind to stabilize the sUAS.

Figure 6:
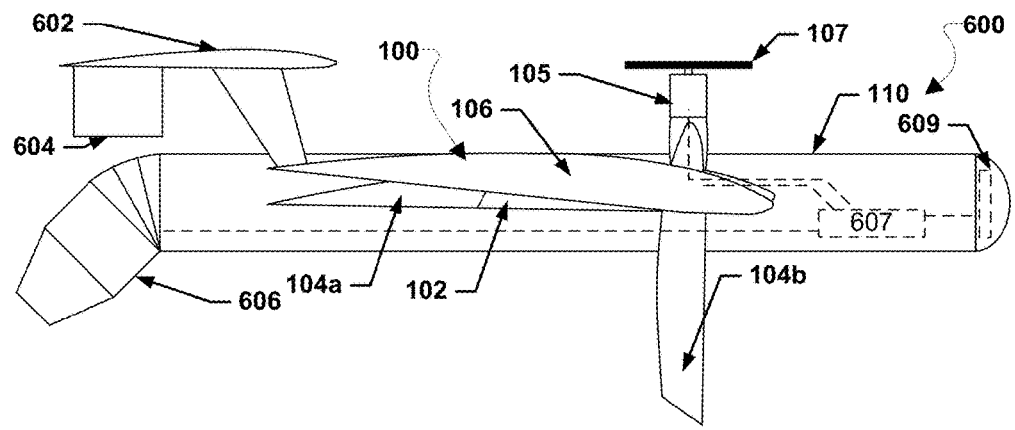
FIG. 6 is a component block diagram illustrating a right side view of an embodiment small unmanned aircraft system (sUAS) in a vertical flight configuration with the freely rotating outboard wing portion rotated up with respect to the fixed wing portion and the wing lifting portion rotated vertically.
Figure 7:
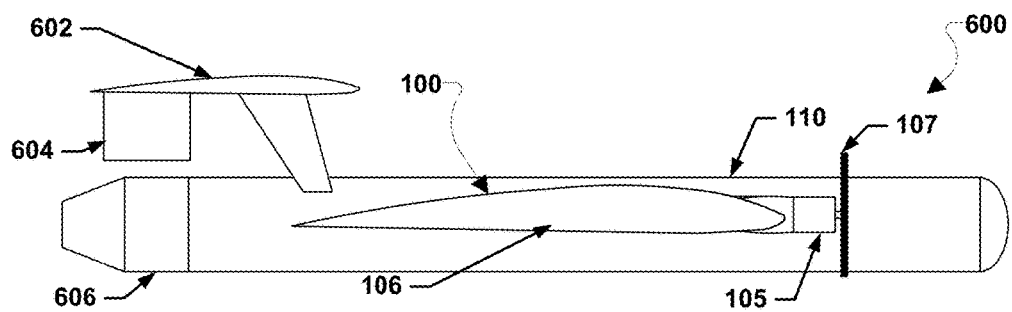
FIG. 7 is a component block diagram illustrating a right side view of the embodiment sUAS in a forward flight configuration.
Figure 8:
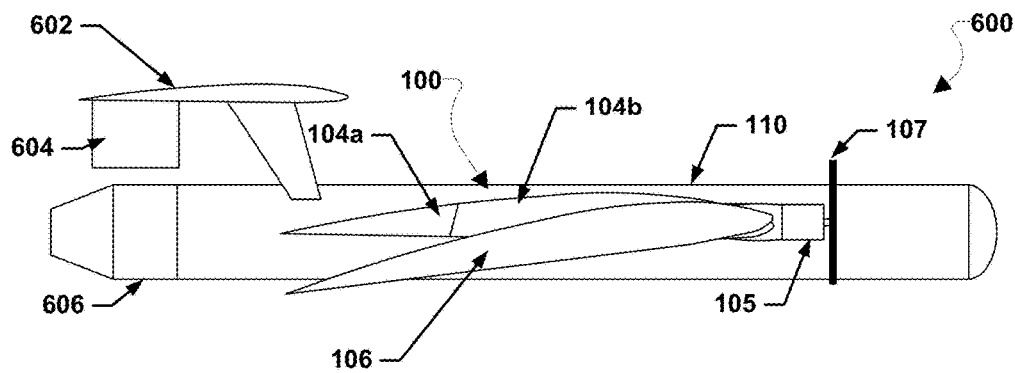
FIG. 8 is a component block diagram illustrating a right side view of the embodiment sUAS in a forward flight configuration with the freely rotating outboard wing portion rotated down with respect to the wing lifting portion and fixed wing portion.

FIG. 6 is a component block diagram illustrating a right side view of an embodiment small unmanned aircraft system (sUAS) 600 in a vertical flight configuration with the freely rotating outboard wing portion 106 rotated up with respect to the fixed wing portion 102 and the controllably articulating portion 104b rotated vertically. The sUAS 600 may include a tail section 602 including one or more vertical stabilizers 604. The sUAS 600 may also include aft propulsor 606 that may be articulated and configured such that the thrust being generated is always in the proverse direction. The aft propulsor 606 is shown rotated down during the V/TOL mode to provide vertical balancing force. In alternative embodiments, an aft pitch control motor and variable pitch propeller may be substituted for the aft propulsor 606. In other embodiments, a fixed pitch motor and propeller may be substituted for the aft propulsor 606. The sUAS 600 may also include a control system 607 connected to the aft propulsor 606, the lifting motor 105, the controllably articulating wing portions 104b, any other control surfaces, controllable pitch propellers, and/or a payload 609, such as a camera. The control system 607 may include one or more processor configured to control the operations of the aft propulsor 606 (e.g., speed, articulation, etc.), the lifting motors 105 (e.g., speed, etc.), the controllably articulating wing portions 104b (e.g., tilt, etc.), any other control surfaces (e.g., ailerons, rudder, etc.), controllable pitch propellers (e.g., pitch, etc.), and/or a payload 609. The control system 607 may be connected to the various devices it controls by one or more wire running throughout the sUAS 600. The control system 607 may also include various sensors, such as airspeed sensors, altitude sensors, gyros, GPS, etc., to enable control of the sUAS. For example, the control system 607 may include a Micropilot® MP2128 HELI2 autopilot control system including a 500 kph airspeed sensor, 12 km altitude sensor, 3 axis acceleration and rate gyroscopes, an ultrasonic altimeter and magnetometer, integrated GPS receiver, and user definable error handling conditions, such as loss of RC command signal, loss of GPS, and UHF data/command link loss instructions. FIG. 7 is a component block diagram illustrating a right side view of the embodiment sUAS 600 in a forward flight configuration. FIG. 7 illustrates that in forward flight mode the lifting motor 105 may be rotated down into the plane of the wing and the aft propulsor 606 may be rotated up to the horizontal position in line with the fuselage 110. FIG. 8 is a component block diagram illustrating a right side view of the embodiment sUAS 600 in a forward flight configuration with the freely rotating outboard wing portion 106 rotated down with respect to the wing lifting portion 104 and fixed wing portion 102.

Figure 9:
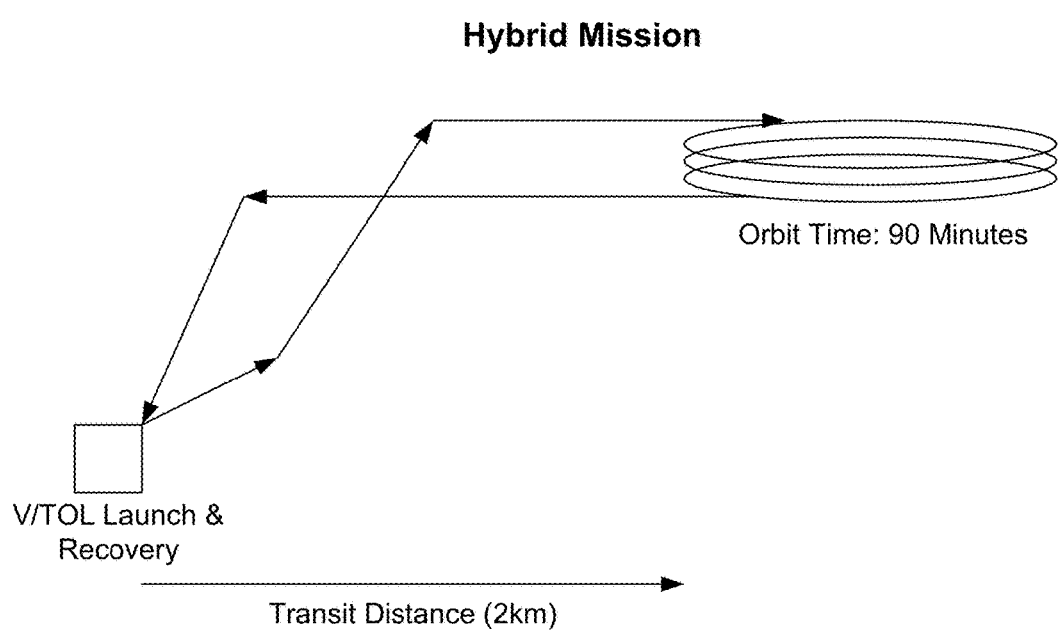
FIG. 9 is a hybrid mission profile enabled by the various embodiments.

FIG. 9 is a hybrid mission profile enabled by the various embodiments. The hybrid mission may provide a long transit distance capability, such as 2 km to/from station, and a long orbit time, such as 90 minutes on station. The hybrid mission may combine the attributes of a typical V/TOL mission and conventional takeoff and landing mission.

Figure 10:
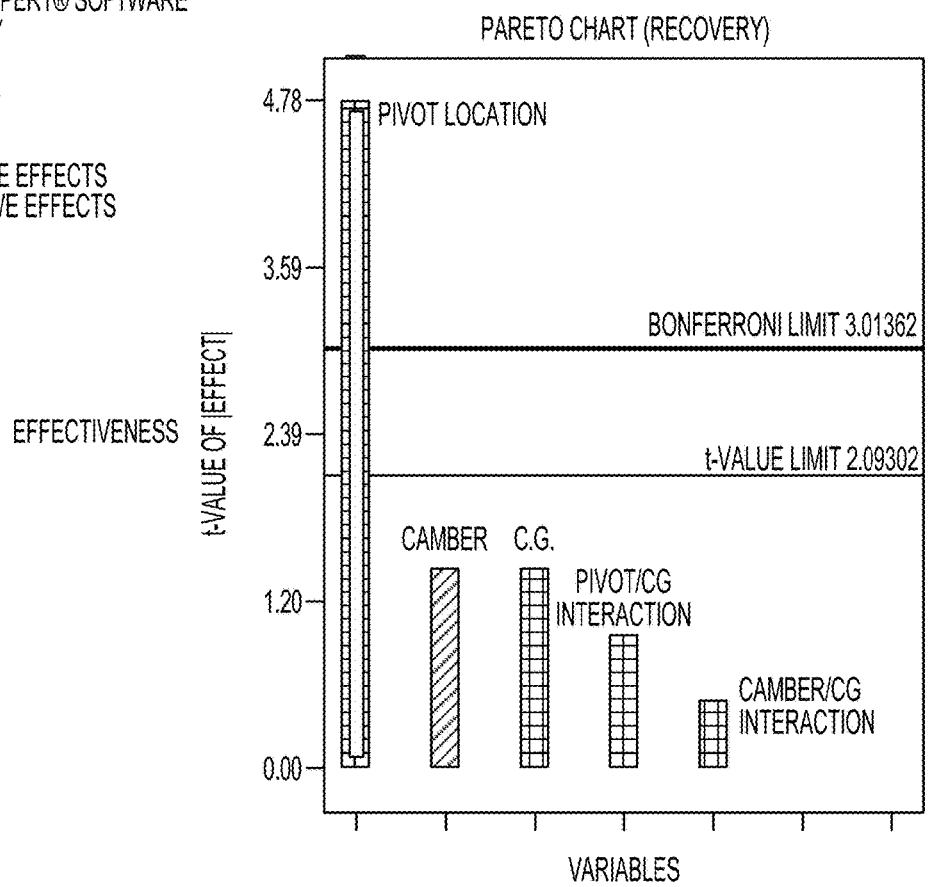
FIGS. 10 and 11 are graphs of results of experiments of the effect of wing camber on gust damping or lift at the neutral angle of attack.
Figure 11:
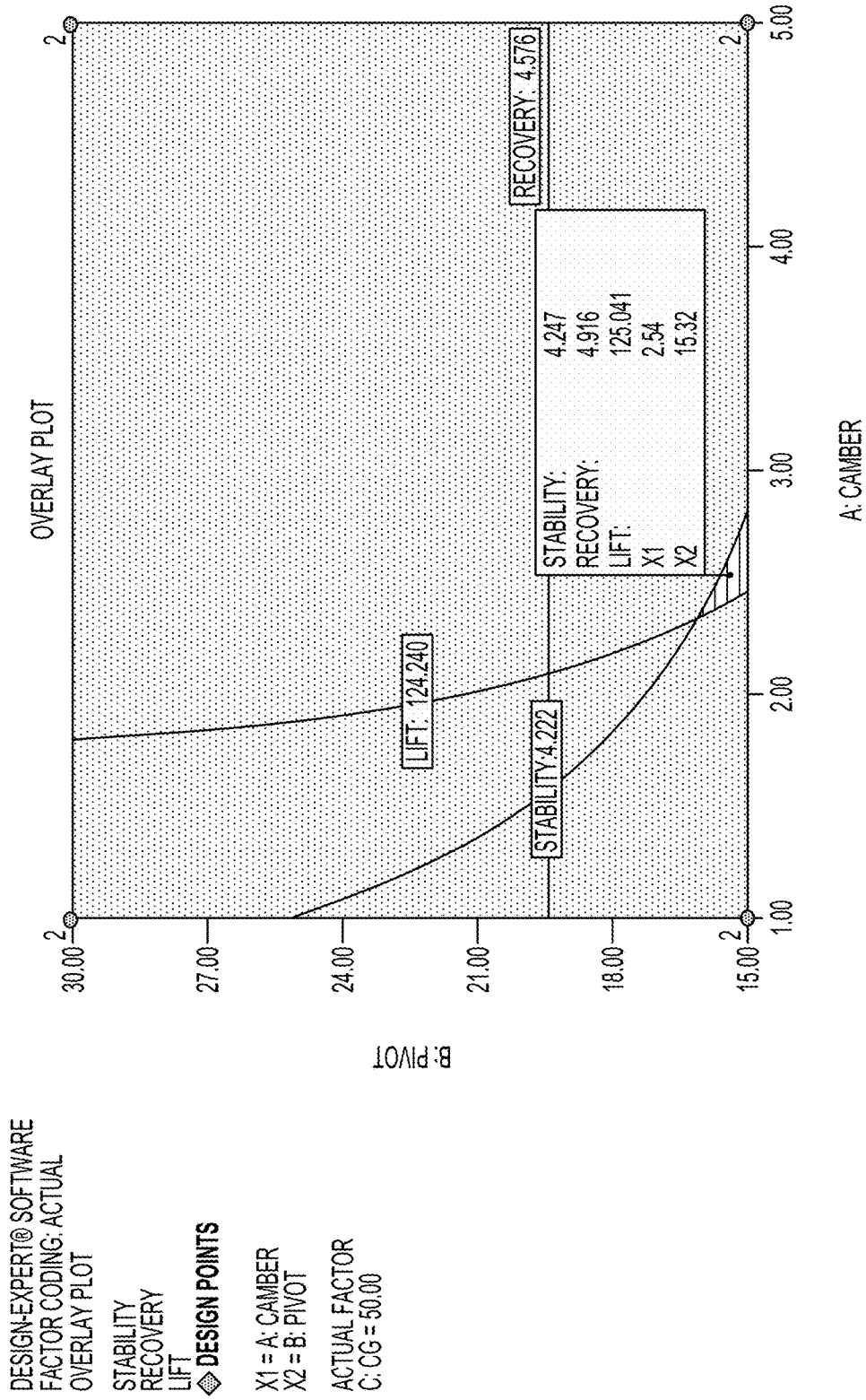
Figure 12:
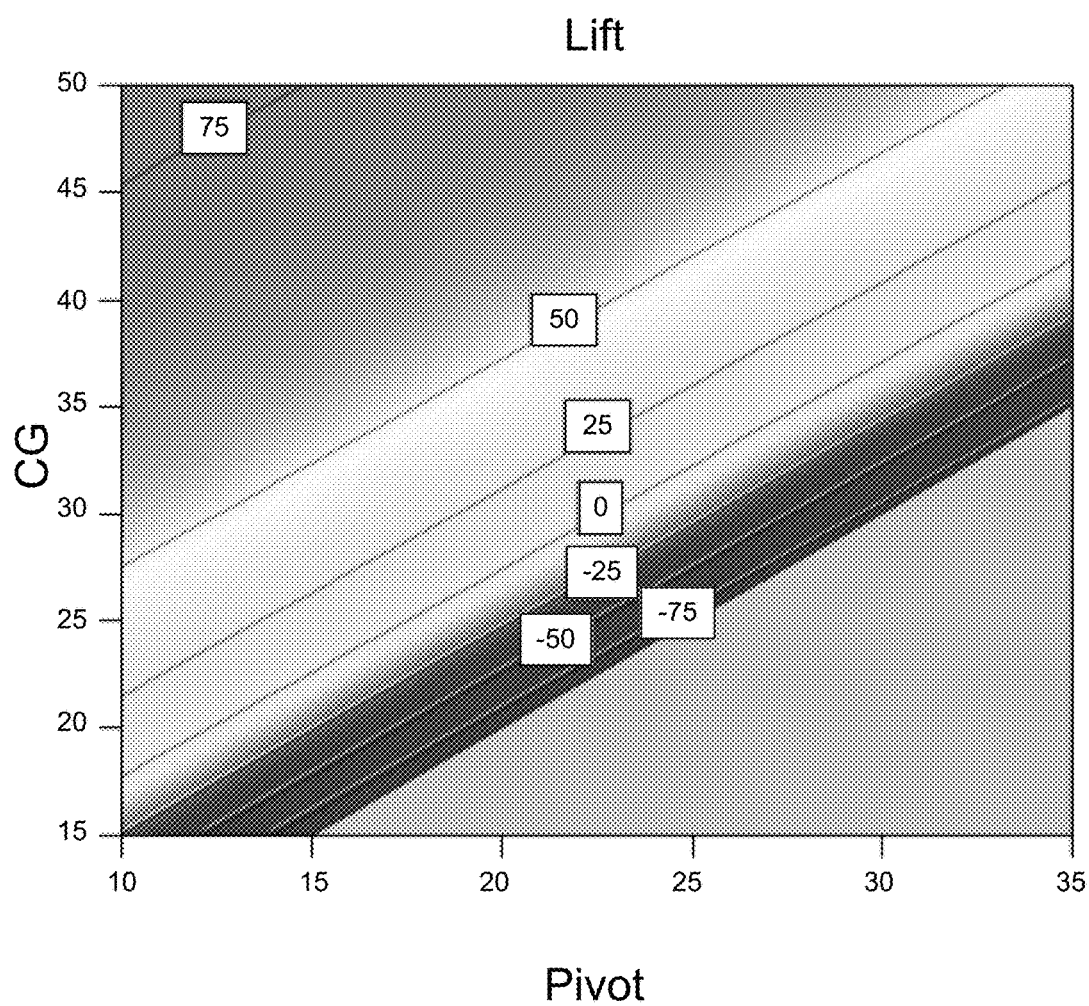
FIG. 12 is a graph illustrating results of experiments conducted to determine a range of optimality for the pivot location and center of gravity location of the embodiment freely rotating outboard wing portion.

Experiments were conducted to determine optimal basic design parameters such as location of the pivot point of the free-to-rotate wing portions, location of the panel center-of-gravity (e.g.), and camber and/or airfoil to optimize lift to drag in a rotating environment. Using a design-of-experiment analysis, a first set of tests were conducted to look at the impact of the camber, pivot, and e.g. in a simplified test apparatus. FIGS. 10 and 11 are graphs of results of experiments of the effect of wing camber on gust damping or lift at the neutral angle of attack. Based on the results from the first set of tests, it appears as though wing camber has little impact on gust damping or lift at the neutral angle-of-attack. A second set of experiments was conducted to determine a range of optimality of the pivot location and e.g. location of the free-to-rotate portions. FIG. 12 is a graph illustrating results of experiments conducted to determine a range of optimality for the pivot location and center of gravity location of the embodiment freely rotating outboard wing portion. The results illustrated in FIG. 12 indicate that lift may be maximized by locating the pivot point as close to the leading edge as possible while moving the e.g. as close to the trailing edge as possible. Thus, the results indicate that lift may be increased when the pivot point is closer to the leading edge and the e.g. is farther from the leading edge.

The various embodiments may be used by first responders (e.g., police and fire) to provide search capabilities and fire monitoring capabilities, agriculture interests to provide crop monitoring, and utilities to provide pipeline monitoring, as well as other capabilities applicable to the use of sUASs.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A compound wing for a fuselage, comprising:
    a fixed wing portion couplable to the fuselage;
    a wing lifting portion coupled to and disposed outboard of the fixed wing portion, comprising:
        a rigid cross member configured not to articulate; and
        a single controllably articulating portion configured to rotate controllably through a range of motion from a horizontal position in line with the fixed wing portion to a vertical position perpendicular to the fixed wing portion; and
    a freely rotating wing portion coupled to and disposed outboard of the wing lifting portion and configured to freely rotate based on wind forces incident on the freely rotating wing portion.

2. The compound wing of claim 1, wherein the controllably articulating portion includes a lifting motor.

3. The compound wing of claim 2, wherein the fixed wing portion is configured to be coupled to the fuselage of a small unmanned aircraft system (sUAS).

4. A small unmanned aircraft system (sUAS), comprising:
    a fuselage; and
    a compound wing, comprising:
        a fixed wing portion coupled to the fuselage;
        a wing lifting portion coupled to and disposed outboard of the fixed wing portion, comprising:
            a rigid cross member configured not to articulate; and
            a single controllably articulating portion configured to rotate controllably through a range of motion from a horizontal position in line with the fixed wing portion to a vertical position perpendicular to the fixed wing portion; and
        a freely rotating wing portion coupled to and disposed outboard of the wing lifting portion and configured to rotate freely based on wind forces incident on the freely rotating wing portion.

5. The sUAS of claim 4, wherein the controllably articulating portion includes a lifting motor.

6. The sUAS of claim 5, further comprising:
an aft propulsor configured to be articulated through a range of motion from a second horizontal position to a downward position.

7. The sUAS of claim 6, wherein during a forward flight mode the controllably articulating portion is in the horizontal position, the aft propulsor is in the second horizontal position, and the freely rotating wing portion is free to rotate.

8. The sUAS of claim 7, wherein during a vertical takeoff and landing (V/TOL) flight mode the controllably articulating portion is in the vertical position, the aft propulsor is in the downward position, and the freely rotating wing portion is free to rotate.

9. A small unmanned aircraft system (sUAS), comprising:
a fuselage;
independently controllable first and second lift engines or motors configured to provide vertical lift in a vertical takeoff and landing mode and forward propulsion in a forward flight mode;
an aft propulsor configured to be articulated through a range of motion from a second horizontal position to a downward position;
first and second compound wings positioned on opposite sides of the fuselage, each of the first and second compound wings including:
a fixed wing portion coupled to the fuselage;
a wing lifting portion coupled to and disposed outboard of the fixed wing portion and having:
a rigid cross member configured not to articulate; and
a single controllably articulating portion to which is mounted a different one of the first and second lift engines or motors, wherein the single controllably articulating portion is configured to rotate through a range of motion from a horizontal position in line with the fixed wing portion to a vertical position perpendicular to the fixed wing portion; and
a freely rotating wing portion coupled to and disposed outboard of the wing lifting portion and configured to rotate freely based on wind forces incident on the freely rotating wing portion; and
a control system configured to control operations of the aft propulsor, the first and second lifting engines or motors, and the controllably articulating wing portions, including independently controlling the first and second lifting engines or motors.

* * * * *